Aug. 24, 1965   E. P. HARRIS   3,201,929
PNEUMATIC CONTAINER AND METHOD AND APPARATUS FOR MAKING SAME
Original Filed June 19, 1957   3 Sheets-Sheet 1
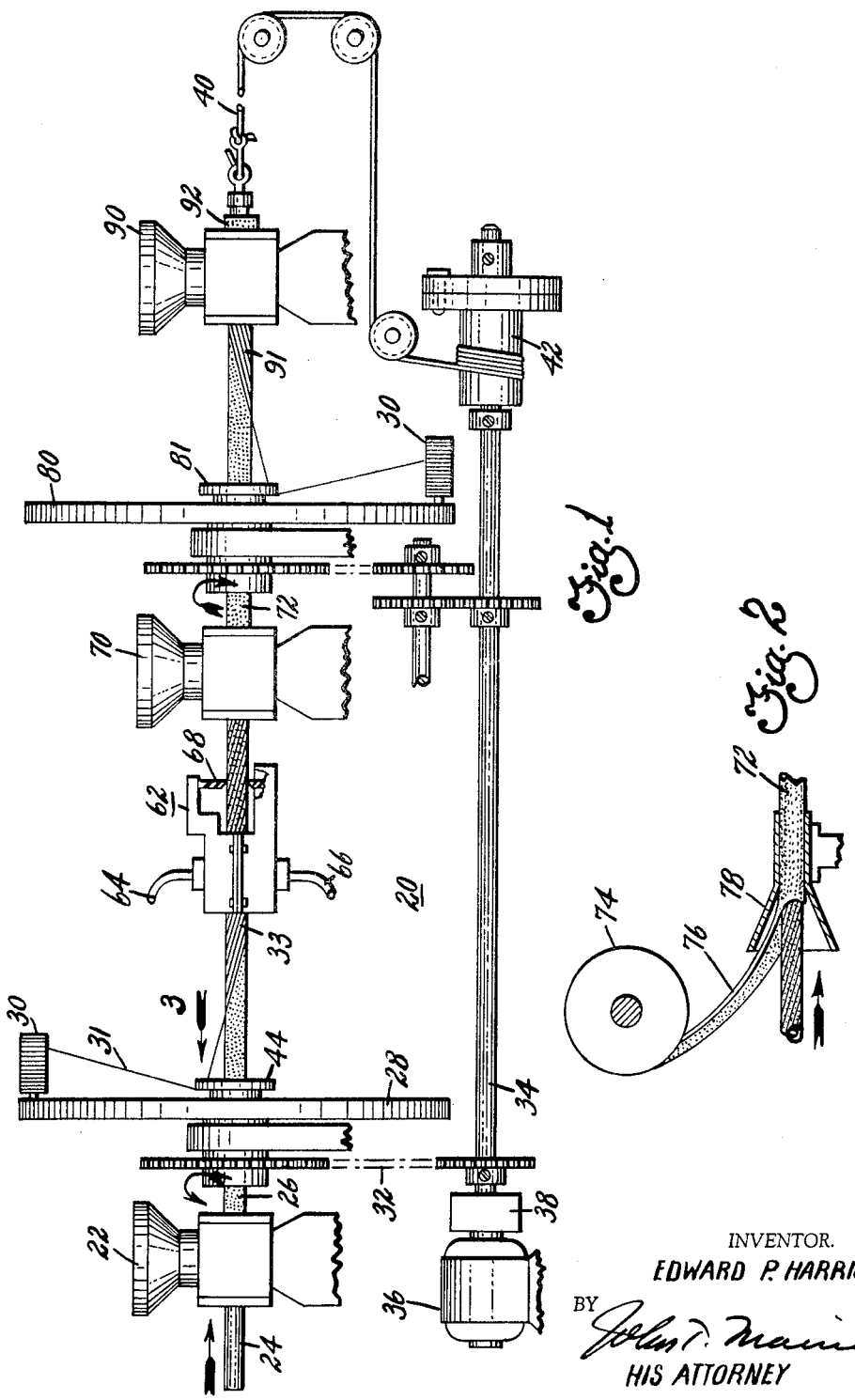
INVENTOR.
EDWARD P. HARRIS
HIS ATTORNEY

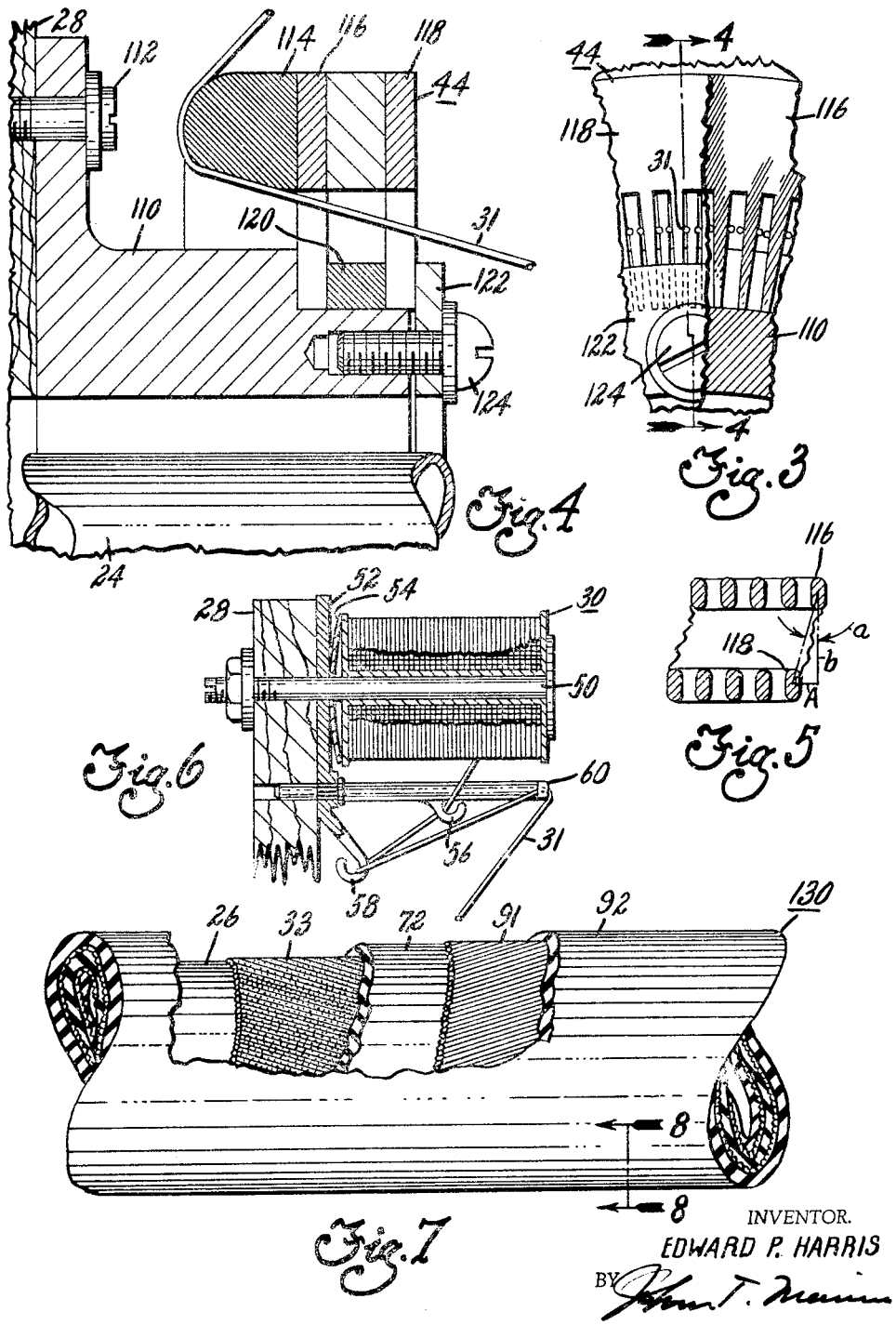

Aug. 24, 1965    E. P. HARRIS    3,201,929
PNEUMATIC CONTAINER AND METHOD AND APPARATUS FOR MAKING SAME
Original Filed June 19, 1957    3 Sheets-Sheet 3

INVENTOR.
EDWARD P. HARRIS
BY
HIS ATTORNEY

United States Patent Office 3,201,929
Patented Aug. 24, 1965

3,201,929
PNEUMATIC CONTAINER AND METHOD AND
APPARATUS FOR MAKING SAME
Edward P. Harris, Dayton, Ohio, assignor to General
Motors Corporation, Detroit, Mich., a corporation
of Delaware
Original application June 19, 1957, Ser. No. 666,556, now
Patent No. 3,033,557, dated May 8, 1962. Divided
and this application Apr. 27, 1960, Ser. No. 25,028
2 Claims. (Cl. 57—15)

This invention relates to air bags and is particularly concerned with the structure of said air bags and the methods and apparatus used in the manufacture thereof.

The present invention is a division of Patent No. 3,033,-557 filed June 19, 1957.

It is an object of this invention to provide a new and improved air bag free from seams or joints whereby the bag is increased in strength and the tendency toward rupture, upon flexing of the bag, is greatly reduced.

In carrying out the above object, it is a further object to more perfectly balance an air bag whereby heavy portions at the periphery thereof are eliminated through the elimination of seams and joints.

Another object of the invention is to provide a method for making an air bag wherein one or more of a plurality of layers of curable elastomeric material may be extruded and wherein cord reinforcements are wound on at least two of said layers and interposed between said layers in criss-cross relation without laps whereby the entire structure may be expanded and subsequently vulcanized to form an air bag of the desired size and shape.

A further object of the invention is to provide a positioning comb for guiding the cords which make up the reinforcing layers in the air bag, the comb being capable of passing knots in the cords without, in any way, reducing the efficiency of the comb to align the cords.

Air bags have many uses, the most common of which are concerned with air springs wherein bags having one or more convolutions are used, vehicular tires and similar annular-shaped objects. The methods for making these bags are varied wherein certain of the bags are made in tubular form on a mandrel from strips wrapped therearound, the resulting tube being expanded and shaped while others, such as vehicular tires, are built up on mandrels from strips to the desired size. In this instance, the joints in the strips cause the tire to be thickened at certain positions which throws the tire out of balance and makes the tire bumpy when in use. When the bags are used for air springs, the joints, due to the flexing of the bag, tend to weaken and establish points of failure.

A bag for an air spring together with a method for making the same is clearly shown in Brown Patent 2,208,-540 wherein a tube made up of lapped strips, wherein the fabric is incorporated within the rubber-like material, is placed in a mold and is expanded and cured therein in the desired shape. The Brown patent shows a two-convolution bag wherein beads or reinforcing wires are present in opposite ends thereof. It is apparent that bags of this character may be formed in a similar manner wherein only one convolution or more than two convolutions are desired.

My invention is specifically directed to an air bag which may be used as a spring, tire or for any other desired use wherein the air bag is formed from a tubular member which is later expanded and shaped to the desired form and is then cured. The tubular member is preferably manufactured from extruded, curable material wherein the cords are wound therein whereby the finished article is devoid of laps and seams and is, therefore, well-balanced and highly resistant toward failure during flexing.

The continuous tube free from laps or joints as made by the present invention may be subsequently formed into an air bag for use as a tire, spring, etc., in the same manner and in similar apparatus to that shown in the Brown patent aforementioned, and this forming or expanding operation is not a part of this invention which is directed specifically to a method for making the tubular member that is to be expanded and to the article subsequently formed which is completely free of laps and unbalanced portions whereby greater uniformity in the air bag is obtained and wherein the strength and rupture-resistant qualities thereof are greatly enhanced.

Further objects and advantages of the present invention will be apparent from the following description, reference being had to the accompanying drawings wherein preferred embodiments of the present invention are clearly shown.

In the drawings:

FIGURE 1 is a view showing one form of apparatus used to make tubular members to be subsequently formed into air bags.

FIGURE 2 is a modification of one stage of the apparatus of FIGURE 1 showing the application of an inner liner for the tube.

FIGURE 3 is a fragmentary enlarged view of the comb used in connection with the cords applied to the tubing and is taken in the direction of the arrow marked 3 in FIGURE 1.

FIGURE 4 is a partial sectional view of the comb shown in FIGURE 3, taken on line 4—4 of FIGURE 3.

FIGURE 5 is a fragmentary diagrammatic section of the comb showing the displacement of one comb member relative to the other.

FIGURE 6 is an enlarged view of one of the cord spools showing the tensioning means and the guiding means.

FIGURE 7 is a partial sectional view of a length of tubing showing the various layers in their proper relationship.

Figure 8:
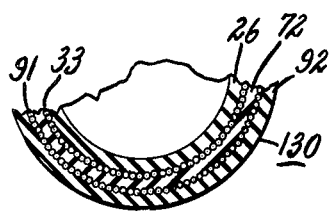
FIGURE 8 is a sectional view taken on line 8—8 of FIGURE 7 showing a cross section of the tube.

The use of air bags, particularly as air springs in suspension systems of vehicles, is becoming more important as speed of travel increases. This may be explained by the fact that when vehicles, such as automobiles, busses, railway cars, etc., travel around curves at high rates of speed, there is a tendency for the vehicle to dip and sway giving an unpleasant sensation to the riders. By the use of air suspension systems, it is possible to feed air into springs at one side of the vehicle and bleed air out of the springs at the other side of the vehicle as it travels around a curve and thus maintain a more or less "even keel" under any and all conditions of road travel.

Another feature which is available when air springs are used in vehicles is the levelizing action of the springs. That is to say, each vehicle is designed to have a definite road clearance and if this road clearance is maintained uniform, the center of gravity of the vehicle is maintained at a set position whereby the vehicle rides better under all conditions. When using conventional coil or elliptical springs, the vehicle settles as the load increases and, furthermore, the spring rate changes markedly. Thus, when the vehicle is empty, its road clearance is greatly increased over the clearance available when the vehicle is full or overloaded. These variables may be eliminated completely when using an air spring suspension since through the use of levelizing systems, the road clearance of the vehicle is maintained constant regardless of the road conditions, thus making for a better ride. Furthermore, the spring rate of an air spring is more constant under varying loads than is the spring rate of a coil or elliptical spring. Thus, the air spring formed from one or more air bags or from a single air bag having one or more convolutions is highly desirable in modern vehicular suspension systems.

These air bags are formed from multi-ply rubber-like material reinforced with cords and these bags, in the past, have been formed in much the same manner as used in forming a tire wherein plys of rubber-like material with and without cords embedded therein are built up on a mandrel into a tubular form as disclosed in the aforementioned Brown patent and are then expanded and cured in the desired shape. Since the initial tube is made up of sheets of different types of material, necessarily the tube includes a plurality of laps and seams. These laps form thickened portions in the finished product making for non-uniformity in cross section and likewise the laps and seams sometimes produce points of failure upon flexing of the bag. It is quite apparent that the laps, for example, in an automotive tire, create points of unbalance in the tire due to the additional material present. In any event, it is highly desirable to produce an air bag free from laps regardless of its end use since such a bag will be more uniform in cross section, have fewer points susceptible to failure, be better balanced and, in general, be a more useful article. The present invention is specifically directed to an air bag of this character and to the method for forming such an air bag wherein at least the inner or outer surface and the cord reinforcing portions thereof are free from laps, joints or seams.

Referring specifically to the drawings, FIGURE 1 shows diagrammatically an apparatus which may be used in the formation of tubing which may be subsequently formed into air bags. The apparatus shown at 20 comprises a cross head tuber 22 through which is passed a mandrel 24. At the exit end of the tuber 22 the mandrel, which is properly treated at the surface thereof, includes a tubular covering 26 of uncured rubber-like material. The mandrel then passes through an apertured rotating disc 28 which carries a plurality of suitably disposed spools 30 each carrying a supply of cord, for example, a nylon cord. The disc 28 is driven through a chain drive 32 from a drive shaft 34 that is rotated by a motor 36 which includes a suitable speed reducer 38 therewith. The mandrel 24 is positively moved toward the right of the apparatus at a constant rate of speed. One way to accomplish this is to attach a cable 40 at the opposite end of the mandrel which is wound up on a reel 42 at the opposite end of the drive shaft 34. Thus, the movement of the mandrel is synchronized with the speed of rotation of the disc 28. The disc 28 includes any suitable number of spools 30 and this is best determined by the diameter of the cord to be used and the diameter of the extruded tubular covering 26 on the mandrel. Preferably, a sufficient number of cords are applied to the surface to substantially cover the surface and these cords are wound onto the surface at an angle of between 5° and 30° to the axis of the mandrel, preferably at about 15°. The angle is controlled by the axial travel of the mandrel and by the comb 44 adjacent the center of the disc 28 which comb will be explained in detail hereinafter. It is apparent that the cords must all be fastened to the surface of the layer 26 on the mandrel at the start of the operation but once the operation is commenced the application of the cords is continuous so long as the supply of cord material is maintained on the spools.

As a specific example, on a mandrel 2¼ inches in diameter wherein the first layer of tubed rubber-like material is .120 inch thick, seventy-two two-ply cords are wound onto the tube whereby the cords are disposed in a layer only one cord thick which substantially cover the entire surface of the tube. The cords each have a normal diameter of .022 inch. Since the disc 28 is rotating in this instance at 1 r.p.m. and the mandrel is travelling at a rate of twenty-eight inches per revolution, the cords are laid onto the surface of the tube layer 26 in a uniform manner and are partially embedded therein. This effect is enhanced by the fact that each spool 30 is provided with a tension device so that the cord being drawn therefrom is under uniform tension. This is shown in FIGURE 6 wherein the spool 30 is carried by a spindle 50 which is mounted on the disc 28. Between the spool 30 and a backplate 52 is a spring member 54 which drags on the spool to provide the degree of tension desired. The cord 31 coming off the spool passes through several hooks 56, 58 and 60 whereupon it is directed to the comb 44. The specific design of the spool, the tensioning device and the feeding hooks form no part of this invention and may be modified as desired.

After the cords are wound directly onto the surface of the tubed inner layer 26, the mandrel with the assembly thereon passes through a box structure 62 wherein a cement is wiped onto the surface of the cord. The cement is pumped through ducts 64 and excess cement passes through exit ducts 66 to a supply means wherein it is recirculated through the box 62. A wiper 68 is provided at the exit of the box for wiping excess cement off the cords and the wiper 68 merely comprises a resilient plate such as a plate made from "Teflon" or "nylon" which rubs against the cords for removing the excess cement which then flows back through the duct 66 for reuse. The mandrel, with the cement-coated cords thereon, then passes through a second cross head tuber 70 whereupon a second layer 72 of uncured rubber-like material is tubed onto the surface of the cord layer. In this instance, the second layer may also be applied in strip form from a reel 74 as shown in FIGURE 2. In this instance, the second layer comprises a longitudinally extending sheet or strip 76 of uncured rubber-like material which passes through a funnel-like device 78 that wraps it around the cord layer on the moving mandrel 24. The second layer 72 may be lapped or butt-jointed, preferably the latter.

The mandrel 24 with the rubber-like layer 72 thereon next passes through a second disc 80 driven by the same type of driving means used with the first disc 28. The disc 80 also includes a plurality of spools positioned around the outer periphery thereof and includes a second comb 81 which is similar in all respects to the comb 44. The only difference with respect to discs 28 and 80 resides in the fact that the disc 80 rotates in a direction opposite to the disc 28 whereby the cord layer superimposed upon the rubber-like layer 72 is wrapped in a criss-cross fashion with respect to the first cord layer. Here again, the angle of wrapping is between 5° and 30° and preferably about 15°. Thus, the two cord layers are wrapped in opposite directions at the same angle from the axis of the mandrel 24. In this instance, a three-ply nylon cord is used having a normal diameter of .027 inch. This larger diameter cord takes care of the increased diameter of the tube. Of course, more spools could be added and a two-ply cord used to accomplish the same result. Also, if the cords are not laid contiguous but allowed to be spaced, this adjustment is not necessary. After the second cord layer is wrapped onto the rubber-like layer 72, the mandrel 24, with its associated layers thereon, passes through a third tuber 90 which tubes a layer 92 of uncured rubber-like material over the second applied cord layer. This layer 92 may also be applied by wrapping if desired. This then forms the finished uncured tubing assembly which comprises three layers of uncured rubber-like material having interposed therebetween layers of cord wrapped in opposite directions so as to form a criss-crossing of the cords, one with respect to the other.

It is understood that a second cement box similar to the box 62 may be used after the wrapping of the second cord layer and this is generally preferable since a better bond is obtained between the rubber-like material and the cords if the cement is applied to the cords. Similarly, pressure rollers, not shown, may be used after each application of the cords and before the application of the cement to further press the cords into the surface of the uncured rubber-like material upon which they are applied. This may or may not be desirable in accordance with the compound used in the uncured rubber-like layers. Of course, as mentioned previously, the cords, due to the tension thereon, self-embed themselves to a degree in the uncured rubber surface upon which they are wound.

It is further understood that if third and fourth cord layers are desired, the plys may be built up in the same manner as those disclosed through the use of additional winding discs and tubers.

It is also manifest that in place of a continuous machine, the lengths of the mandrel may be removed and passed through separated tubers providing the ends of the cord are bound so as to prevent unraveling. All of these modifications are contemplated.

Figure 9:
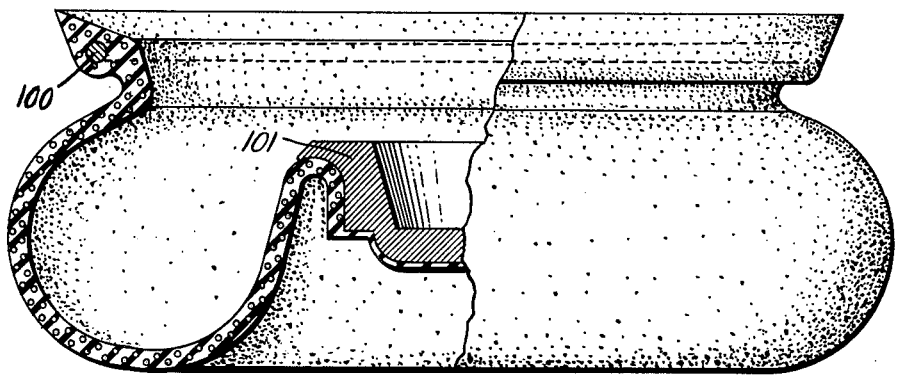
FIGURE 9 is a view of the tube shown in FIGURE 7 expanded into the form of an air bag.

After the finished tubing is made by the method disclosed, the mandrel, which is preferably formed of a plurality of pieces of specific lengths joined together, is broken and the tubing is cut so that each length of mandrel supports a similar length of tubing. The tubing is then slipped off the treated surface of the mandrel and cut into lengths compatible with the curing mold to be used and the tubing is pressure-formed and cured in the mold. In this connection, the application of a wire bead as shown at 100 in FIGURE 9 is carried out in a conventional manner wherein, if a wide-mouth opening is desired as shown, the tube is flared to the desired diameter prior to being placed in the curing mold whereupon the bead and tube are held while the remainder of the bellows of an air bag is pressure-formed and cured within the mold.

In place of the second applied rubber-like layer 72, it is possible to form the second layer by application of a plurality of coatings of cementitious material. This method is useful in some instances whereby the intermediate rubber-like layer is built up from rubber-like material dissolved in a suitable solvent which is applied and evaporated until a layer of a desired thickness is obtained.

Referring specifically to FIGURES 3, 4 and 5, a section of the comb used with the cord winding discs is shown in detail. This comb comprises a flanged apertured tube 110 which is bolted by means of bolts 112 to the disc 28 or 80 as the case may be. The tubular portion 110 extends outwardly of the disc, surrounds the mandrel and supports, adjacent its outer end, an annular rubber block 114 over which the cords pass. The block 114 has at its outer end a pair of comb members 116 and 118. These comb members provide a plurality of teeth which are held spaced by spacer 120 and which are held in relative radial position to one another and to the member 110 by a disc 122 bolted to the member 110 by bolts 124. When the bolts 124 are loosened, the two comb members 116 and 118 are rotatable with respect to one another so that the tooth position of one comb relative to the other comb may be varied. In this instance, the width of the spaces between the teeth is at least twice the diameter of the cord to be used while the lateral spacing between the two comb members is at least four times the diameter of the cord to be used. This particular spacing is used to permit knots in the cord to pass therethrough. It has been found that where a single cord is used and the cord on the spools includes knots, each time a knot comes to the conventional comb, the cord breaks and requires shutting down of the machine. The present comb, due to the wide spacing between the teeth, permits the knots to pass therethrough. When "nylon" cords are used, the knots must be of a special character to prevent slipping and, in this instance, the knots present a diameter of about four times the diameter of the cord and, of course, where "nylon" cords are used, the spaces between the teeth on each comb should not be less than four times the diameter of the cord, these factors being determined for the specific cord being used. Since the spacing between the comb teeth is greater in all instances than the diameter of the cord and, since the cords are generally laid onto the mandrel at an angle, it is necessary to orient the two comb members to prevent the cords from going onto the mandrel in pairs. These comb members are spaced radially with respect to one another as shown in FIGURE 5 wherein the distance between the center lines of the teeth or, for that matter, between the edge of adjacent teeth, is shown at "A," and is equal to the product of the tangent of the angle on which the cords are to be wrapped and the distance between the comb members or the tangent of angle "a" times "b." When the combs are displaced radially in this manner, the cords will always rub, as shown in FIGURE 3, against opposite sides of the teeth whereby they are properly guided as they are laid upon the rubber-like layer on the mandrel.

The finished tube is shown in FIGURES 7 and 8 at 130 wherein the outer layer 92 covers a second cord layer 91 which is laid upon the second rubber-like layer 72 which, in turn, covers the first cord layer 33 which is laid upon the first rubber-like layer 26. This forms what may be termed a two-ply tube wherein the cord layers 33 and 91 are criss-crossed from one another. When the tube is expanded to form the air bag, these cord layers expand and move to form a lattice-like reinforcing structure which, when the material of the formed bag is cured, become integrated with the remainder of the bag for reinforcing the same.

It is apparent that since the bag contains no laps in the cord layers, the strength of the bag is greatly increased over lap-type structures and similarly, the possibility of rupture of the bag is greatly decreased since there are no joints or seams in the reinforcement which might weaken the bags. In this connection, therefore, at no point in the present air bag structure is there more than two layers of cord as differentiated from the usual lapped type of structure wherein there are four cord layers in the seams to form thick joints which weaken upon continued flexing and creates points of rupture.

It is manifest that tubes of this character may be formed into tires by practicing the same procedures as used in the manufacture of air bags, the only difference being that the mold is of slightly different shape and wire beads are used at opposite sides of the tube.

In the present instance, a finished tube 2.240 inches in outer diameter and having an I.D. of 2 inches is formed into an air bag having a maximum outside diameter of seven and one-half inches. Obviously, other bags may be formed from the same diameter tubing although they will vary in strength and deflection characteristics over the present bag and, in all cases, it is best to arrive at the desired thickness and structure of the starting tubing by trial of the finished product.

The rubber-like material used in the manufacture of these bags may be any suitable vulcanizable material such as compounded natural rubber, compounded butadiene styrene copolymer rubber, compounded butadiene acrylonitrile copolymer rubber, compounded polychloroprene, etc., or compatible mixtures of any of the above, etc., wherein the compound is similiar to the usual grade of tire stock. The specific formulation of the rubber-like compounds form no part of this invention, it merely being necessary to have uncured material which is capable of being subsequently vulcanized or cured and which is compounded to provide the desired strength, flexibility and hardness. Since all of these factors are controlled by well-known expedients, further elaboration thereon is not believed necessary.

The term nylon as used herein is the tradename for a super polyamide such as the reaction product of a diamine and a polybasic acid, etc. This material and the reactions used in its manufacture is clearly disclosed in Carothers Patents 2,130,947, 2,130,948 and 2,130,523, for example. Teflon is a tradename for polytetrafluoroethylene.

While the embodiments of the present invention as herein disclosed constitute preferred forms, it is to be understood that other forms might be adopted.

What is claimed is as follows:

1. A positioning comb for aligning and supplying a plurality of moving filaments in parallel relation to a subsequent operation wherein each filament is fed from a source capable of providing an indeterminate length of the filament, the combination comprising; a first comb member including a plurality of equally spaced teeth therealong, the spacing between each tooth being equal to at least twice the diameter of the filament, a second comb member dimensionally similar to the first member and disposed in spaced coaxial relation to the first member and positioned transversely with respect thereto so that the teeth of the first comb member are displaced from the teeth of the second comb member a distance equal to the product of the tangent of the angle to which the filaments are being fed times the distance between the comb members wherein the distance between the comb members is at least four times the diameter of the filament.

2. A positioning comb for applying a plurality of filaments in closely spaced position to a moving mandrel at a predetermined angle out of parallel with the axis of the mandrel, the combination comprising; a circular comb member having a plurality of radially equally spaced teeth therearound wherein the spacing between adjacent teeth is equal to at least twice the diameter of a filament, a second comb member spaced coaxially and laterally from the first comb member a distance of at least four times the diameter of the filament and dimensionally identical to the first comb member, said second comb member being positioned so that the teeth thereof are radially displaced from the teeth on the first comb member a distance equal to the product of the tangent of the angle to which the filaments are to be fed to the mandrel times the distance between the comb members.

References Cited by the Examiner

UNITED STATES PATENTS

| 1,014,361 | 1/12 | Aumann | 28—54 |
| 1,818,845 | 8/31 | Fessl | 57—138 |
| 1,958,598 | 5/34 | Trebes | 57—138 |
| 2,802,328 | 8/57 | Ritchie | 57—13 |

EARL M. BERGERT, *Primary Examiner.*

CARL F. KRAFFT, *Examiner.*